United States Patent Office 3,453,077
Patented July 1, 1969

3,453,077
PROCESS FOR PREPARING MICROSPHEROIDAL SILICA
James R. Hyde, Cincinnati, Ohio, assignor to W. R. Grace & Co., New York, N.Y., a corporation of Connecticut
No Drawing. Continuation-in-part of application Ser. No. 453,186, May 4, 1965. This application Aug. 10, 1967, Ser. No. 659,577
Int. Cl. C01b 33/16
U.S. Cl. 23—182        4 Claims

ABSTRACT OF THE DISCLOSURE

Method for preparing microspheroidal silica having a surface area within the range of from about 100 to 600 m.$^2$/g. and a pore volume of from about 1.0 to 2.5 cc./g.; said method being characterized by an ammoniation step wherein the aged acidified hydrogel is treated with ammonia resulting in a decrease in surface area with little if any increase in pore volume and in some cases a decrease in pore volume.

---

This application is a continuation-in-part of application Ser. No. 453,186 filed May 4, 1965 now abandoned.

In summary, the process of this invention comprises the steps of preparing an alkali metal silicate solution having a silicate content, expressed as silica, of from 3 to 12 percent, gelling the silicate with gaseous carbon dioxide, aging the gelled silicate at a temperature of from 70 to 180° F. for a period of from 0 to 3 hours, mixing the hydrogel with a quantity of a mineral acid sufficient to adjust the pH of the hydrogel to less than 7.0, aging the acidified hydrogel at a temperature of from 70 to 180° F. for a period of from 0 to 3 hours, mixing the hydrogel with a quantity of ammonia sufficient to raise the hydrogel pH up to from about 7 to 9.5, aging the hydrogel for a period of from 0 to 6 hours at a temperature within the range of 70 to 180° F., spray drying the hydrogel, washing the spray dried gel to remove soluble impurities, and redrying the silica gel. In a further embodiment of my invention, the initial gelation may be effected using an acid, such as sulfuric acid, rather than carbon dioxide and then treating the gel in the same manner as outlined above.

It is known that almost all solids are capable of adsorbing gas, vapors, or liquids on their surface to some degree and that the amount adsorbed depends on the nature and extent of the surface. One of the better known adsorbents is commercial silica gel which has a lattice structure formed by an extensive network of void spaces. This structure permits the gel to adsorb approximately 50 percent of its weight of water from saturated air. From this, it has been estimated that one cubic inch of silica gel contains pores having a surface area of about 50,000 square feet. With this enormous internal surface and infinite number of small diameter capillaries, silica gel attracts vapors, condensing them and holding them as liquids. The same phenomenon applies to the adsorption of liquids.

The silica gels are normally prepared by mixing a sodium silicate solution with a quantity of an acid sufficient to completely neutralize the sodium silicate solution. This step produces a hydrosol, which upon standing forms a hydrogel. The hydrogel, when aged, undergoes syneresis. This phenomenon shrinks the gel. The beginning of syneresis of the silica gel can be detected by the appearance of droplets of water on the surface of the gel.

After the beginning of syneresis, the silica gel is washed. The method of washing the gel determines the type of gel to be recovered as the product. If a "regular density" gel is to be recovered, the gel is washed with a dilute sulfuric acid solution. After the washing is complete, the gel is dried. The "regular density" silica gel normally has a surface area of about 800 m.$^2$/g. and a pore volume of 0.3 to 0.4 cc./g. If a silica gel product is desired having a surface area of about 300 to 500 m.$^2$/g., the gel is washed with an aqueous ammonia solution at the outset of syneresis. The product recovered from this treatment has a surface area of about 300 to 500 m.$^2$/g. and a pore volume of 0.65 to 1.0 cc./g. If a gel having a surface area of from 500 to 800 m.$^2$/g. is desired, the gel is washed with water at the beginning of syneresis. The product recovered has a pore volume of from about 0.35 to about 0.65 cc./g.

Silica gels are widely used as catalyst bases, fillers, desiccants, etc. Development of new industrial processes and the refinement of old processes have created needs for silica gels having surface area and pore volume combinations which cannot be economically produced by the above methods. A combination of a particular pore volume and surface area range which falls outside of those normally produced by the above-described conventional processes is often desired. However, it should be stressed that my invention resides not in the product but in a new and unobvious process of preparing such silica gels. For example, in certain polymerization processes, silica gels with a pore volume greater than one cc./g. but with a surface area which is within the range of from 100 to 600 m.$^2$/g. are required as catalyst bases.

It is the object of this invention to provide practical, economical processes for forming silica gels having pore volumes within the range of from 1.0 to 2.5 cc./g. and surface areas within the range of from 100 to 600 m.$^2$/g.

Unless otherwise stated, concentrations are herein given as weight percents.

The first step of the process of this invention comprises preparing an alkali metal silicate solution having a silicate content, expressed as silica, of from about 3 to 12 percent. The preferred silica level is between 4.5 and 9 percent silica. Suitable alkali metal silicates include sodium silicate and potassium silicate. The desired concentrations can be obtained by dilution of more concentrated silicate solutions. The silica to alkali metal oxide weight ratio of the alkali metal silicate is not critical, but the preferred range is from about 3.0:1 up to 3.4:1.

The next step in the process of this invention comprises gelling the silicate with gaseous carbon dioxide. This can be accomplished by bubbling the gas into a vessel containing the alkali metal silicate, or the reactants can be contacted in a mixing nozzle. Regardless of the method of mixing employed, the reactants are thoroughly agitated following mixing and during the formation of the silica hydrogel so that an aqueous slurry of hydrogel particles containing dissolved alkali metal carbonate is formed. The gelation with gaseous carbon dioxide can be followed by an aging step up to 3 hours at temperatures of from 70 to 180° F. if desired. It has been found that aging at this stage of the process effects an increase in the pore volume and a decrease in the surface area of the product gel. Increased aging temperatures have been found to increase this effect.

The next step in the process comprises mixing the hydrogel with a quantity of a mineral acid sufficient to adjust the pH of the gel to less than 7.0. This acidification step provides increased neutralization of the alkali metal silicate and releases carbon dioxide from the gel slurry. The carbon dioxide can be collected for reuse in the process. The acid treatment of the hydrogel can be followed with an aging step, if desired. It has been found that aging at this stage of the process also effects an increase in pore volume, however, to a lesser extent than aging immediately following the gelation step.

The next step in the process of this invention comprises mixing the hydrogel with a quantity of ammonia, preferably an ammonium hydroxide solution, sufficient to raise the gel pH to from above 7 to 9.5. The alkaline treatment for pH adjustment can be followed with an aging step comprising aging the hydrogel for from 0 to 6 hours at a temperature within the range of 70 to 180° F. It has been found that ammoniation of the silica hydrogel at this stage of the process effects a decrease in surface area of the silica gel while at the same time producing only a slight change in the pore volume as contrasted with the prior art tailoring processes in which a substantial decrease in surface area results in a substantial increase in pore volume. In my process I am able to decrease surface area with no or only a very slight increase in pore volume and in some cases actually effect a decrease in both pore volume and surface area. Adjustment to the higher pH values, increased aging times, and increased aging temperatures have been found to increase this effect.

In the next step of the process the silica gel is spray dried. The material can be filtered before it is spray dried but, however, no apparent quality advantage is derived from the filtration and the material can be spray dried directly. In spray drying, the silica gel is sprayed as a fine mist into a drying chamber heated by a suitable means, such as combustion of propane. The mist is introduced into the top of a spray drier where it contacts a countercurrent flow of hot gases in its downward flight and settles to the bottom as solid, dry, spheroidal particles of substantially uniform size and shape. Control of particle size may be effected by controlling the characteristics of both the nozzle of the spraying device and the slurry being dried. The spray drier is commonly operated with an inlet temperature of from 800 to 1000° F. and an outlet temperature of about 300 to 400° F.

The spray-dried silica gel is then washed to remove soluble impurities. The washing is carried out with a dilute soluble mineral acid solution having a normality of less than 5 N. Aqueous sulfuric acid solutions having concentrations within the range of from 0.2 to 5 percent can be employed. The wash is preferably carried out at elevated temperatures within the range of from 100 to 140° F. Particularly satisfactory results are obtained when the material is washed with a dilute sulfuric acid solution having a concentration range of from 0.5 to about 2° Bé. The silica gel, alternatively, can be washed with a dilute ammonium sulfate solution having a concentration of from 0.5 to 5 percent ammonium sulfate. After the acid wash, the product can be washed with deionized water to remove the residual soluble impurities from the gel. After the material is washed, it is dried at temperatures of from about 250 to 500° F. The time of drying is adjusted so that the final product has a total volatile content, principally moisture, of about 4 to 15 percent.

In an alternative embodiment of my invention, the initial gelation is effected by using a mineral acid rather than carbon dioxide, though, of course, the carbon dioxide embodiment is economically more preferable. The first steps of the acid process are similar to conventional acid gel preparations and comprise first preparing an aqueous alkali metal silicate solution containing from about 6 to 12 percent silicate, expressed as silica. Suitable alkali metal silicates include sodium silicate, potassium silicate, and the like. The alkali metal silicate solution is heated to a temperature within the range of from about 110 to 170° F. and preferably from about 120 to 160° F.

The next step in the process of this embodiment comprises mixing the alkali metal silicate solution with a quantity of a mineral acid which is sufficient to effect substantially 100 percent neutralization of the alkali metal silicate. Suitable mineral acids which can be present in the acid solution include hydrochloric acid, nitric acid, phosphoric acid, sulfuric acid, and the like. Sulfuric acid is preferred for economic reasons. Sulfuric acid solutions which are suitable can have concentrations within the range of from 20 to 50 percent and preferably within the range of from 35 to 45 percent. The acid solution and the alkali metal silicate solution are mixed with stirring. The addition of the acid solution to the alkali metal silicate solution is usually made over a period of from about 5 to 30 minutes, and preferably from about 10 to 15 minutes. Gelation normally occurs in less than 6 minutes. Agitation and recirculation of the mixture are maintained throughout gelation and aging.

The silica gel is then aged at a temperature of from about 100 to 190° F. for from 0.25 to 6 hours, preferably 0.5 to 3 hours. The pH is then checked to ensure that it is not above 7.0, and if above 7.0 sufficient acid is then added to reduce the pH to below 7.0 to ensure essentially complete neutralization of the alkali metal silicate. The remainder of the treatment which is the essence of my invention is the same as set forth above with respect to the carbon dioxide gelling embodiment, Column 3, lines 1 through 55.

The product of my invention has a surface area within the range of from 100 to 600 m.$^2$/g. and a pore volume greater than one cc./g. The product silica gel is very useful as a base in the preparation of catalysts such as polyolefin polymerization catalysts.

The invention is further illustrated by the following specific but nonlimiting examples.

EXAMPLE I

This example shows how the process of this invention can be employed to provide a silica gel having a high pore volume and an intermediate surface area.

A dilute sodium silicate solution containing 8.5% silicate, expressed as silica, was prepared. This solution was pumped at a rate of one gallon per minute through a reaction coil, and carbon dioxide was added so that gelation occurred within 40 to 60 seconds. The mixture having a temperature of 135° F. was pumped for 30 minutes into an agitated tank. The resultant hydrogel slurry was heated to 180° F. over a period of 35 minutes, and was then aged at this temperature for 1.5 hours. The pH of the aged gel was 10.6. A quantity of a 39% sulfuric acid solution was added over a period of 25 minutes, sufficient to lower the gel pH to 4.9. Then the acidified gel was mixed with a 23% ammonia solution in a quantity sufficient to increase the gel pH to 7.8. The gel was aged for 3 hours at 180° F. The gel was spray dried, washed with a 1° Bé. sulfuric acid solution having a temperature of 135° F., and was then washed with deionized water having a temperature of 135° F. The product was dried at 400° F.

The product was analyzed for sodium and sulfate contents using standard analytical procedures. The surface area of the product was determined using the well-known Brunauer-Emmett-Teller method. The pore volume of the gel product was determined using standard techniques, as described in Analytical Chemistry, Innes, W. B., (28, 332–4, 1956). The product had a surface area of 150 m.$^2$/g., a pore volume of 1.32 cc./g., a sodium content (expressed as the oxide on a dry basis) of 0.03%, and a sulfate ion content of 0.29%.

EXAMPLE II

This example shows how the process of this invention can be employed to provide silica gels having both surface areas and pore volumes greater than those obtained following the procedure of Example I.

A sodium silicate solution containing 6.1% silicate, expressed as silica, was prepared. The silicate solution was pumped at a rate of one gallon per minute through a reaction coil, and carbon dioxide was added so that gelation occurred within 45 to 60 seconds. The pH of the gel was 10.35. The gel, having a temperature of 130° F., was pumped for 30 minutes into an agitated tank. The gel was heated over a period of 30 minutes to 180° F.

and aged for one hour at this temperature. The aged gel was mixed with a quantity of 25% sulfuric acid solution over a period of 25 minutes, sufficient to reduce the gel pH to 4.7. The acidified gel was aged for 25 minutes. The gel was then mixed with a quantity of 23% ammonia solution sufficient to raise the gel pH to 8.0, and the gel was aged for 30 minutes at a temperature of 180° F. The gel was then spray dried, washed with a 1° Bé. sulfuric acid solution having a temperature of 135° F., then washed with deionized water having a temperature of 135° F., and was then dried at 400° F.

The product gel was then analyzed as described in Example I. The product gel had a surface area of 308 m.²/g., a pore volume of 1.92 cc./g., a sodium content (expressed as the oxide) of less than 0.05%, and a sulfate content of less than 0.5% on a dry basis.

EXAMPLE III

This example illustrates the advantageous effect of my process as contrasted with the same identical process but without my ammoniation step. In this example a silica hydrogel was prepared in substantially the same manner as in Example I and then split into two portions, one portion being treated in accordance with my invention and one portion being treated without my ammoniation step.

More specfically, a dilute silicate solution containing 8.4% silicate, expressed as silica, was prepared. This solution was pumped at a rate of one gallon per minute through a reaction coil and carbon dioxide was added to that gelation occurred within 40–50 seconds. The mixture having a temperature of 135° F. was pumped for 30 minutes into an agitated tank. The resultant hydrogel slurry was heated to 180° F. over a period of 30 minutes, and was then aged at this temperature for 1.5 hours. A quantity of a 39% sulfuric acid solution was added over a period of 30 minutes to lower the gel pH to 4.9. At this point the batch was split into two parts:

Part A.—The acidified hydrogel was aged three hours at 180° F., then cooled to 112° F. to retard aging until Part B was dried.

Part B.—The acidified hydrogel was mixed with sufficient 23% ammonia solution to increase the gel pH to 7.8. This gel was then aged three hours at 180° F.

Both portions were spray dried, washed with a 1° Bé. sulfuric acid solution at 135° F. and then washed with deionized water at 135° F. The product was finally dried at 400° F. and then analyzed in the same manner as Example I.

Analysis:

|  | Part A | Part B |
|---|---|---|
| Surface area, m.²/g | 196 | 128 |
| Water pore volume, cc./g | 1.22 | 1.23 |
| Percent Na₂O | .01 | .01 |
| Percent SO₄ | .1 | .1 |
| Percent Al₂O₃ | .2 | .2 |

EXAMPLE IV

This example illustrates the advantageous effect of my process as contrasted with the same identical process but without my ammoniation step. In this example a silica hydrogel was prepared in substantially the same manner as in Example II and then split into two portions, one portion being treated in accordance with my invention and one portion being treated without my ammoniation step.

A sodium silicate solution containing 6.1% silicate, expressed as silica, was prepared. The silicate solution was pumped at a rate of one gallon per minute through a reaction coil, and carbon dioxide was added so that gelation occurred within 40–50 seconds. The pH of the gel was 10.3. The gel, having a temperature of 130° F., was pumped for 30 minutes into an agitated tank. The gel was heated over a period of 35 minutes to 180° F. and aged for one hour at this temperature. The aged gel was mixed with a quantity of a 25% sulfuric acid solution over a period of 25 minutes sufficient to reduce the gel pH to 4.7. The acidified gel was aged for 25 minutes, then split into two parts:

Part A.—The gel was aged 30 minutes additionally at 180° F., then cooled to 112° F. to retard aging until Part B was dried.

Part B.—The gel was mixed with a quantity of a 23% ammonia solution sufficient to raise the gel pH to 9.0, and the gel was aged for 30 minutes at 180° F. Both parts were then spray dried, washed and finally dried and analyzed as in Example III.

Analysis:

|  | Part A | Part B |
|---|---|---|
| Surface area, m.²/g | 369 | 326 |
| Water pore volume, cc./g | 1.82 | 1.83 |
| Percent Na₂O | .02 | .02 |
| Percent SO₄ | Nil | Nil |
| Percent Al₂O₃ | .2 | .2 |

As may be seen from Examples III and IV, I am able to obtain a substantial reduction in surface area as compared with silica gel produced without my ammoniation step and at the same time with only a negligible increase in pore volume.

EXAMPLE V

This example illustrates the embodiment of my invention wherein the gelling agent is a mineral acid.

In this example a 20 gallon solution of dilute sodium silicate containing 8.1% silicate, expressed as silica, and having a temperature of 135° F. was prepared. To this solution was added a quantity of a 39% sulfuric acid solution sufficient to reduce the pH of the mixture to 10.5 over a period of 17 minutes. Gelation occurred 7 minutes later. The silica hydrogel was then mixed with sufficient 39% sulfuric acid over a period of 70 minutes to reduce the pH of the silica gel to 5.9. The acidified gel was then aged for 2 hours at 135° F. The acidified gel was then mixed with a 23% ammonia solution in a quantity sufficient to increase the gel pH to 8.0. The ammoniated gel was mixed 17 minutes, then spray dried, washed with a 1° Bé. sulfuric acid solution at 135° F., then washed with deionized water at 135° F., and then dried at 400° F. The surface area and pore volume of this product were determined in the same manner as in Example I and were found, respectively, to be 384 m.²/g. and 1.64 cc./g.

Obviously, many modifications and variations of the invention as hereinabove set forth may be made without departing from the essence and scope thereof, and only such limitations as are set forth in the appended claims should be applied.

I claim:

1. A process for preparing a microspheroidal silica having a surface area within the range of from 100 to 600 m.²/g. and a pore volume greater than one cc./g. comprising the steps of:
   (a) preparing an alkali metal silicate solution having a silicate content, expressed as silica, of from 3 to 12% by weight,
   (b) gelling the silicate with a gelling agent selected from the group consisting of carbon dioxide and mineral acids,
   (c) aging the gelled silicate at a temperature of from 70 to 180° F. for a period of from 0 to 6 hours,
   (d) mixing the hydrogel with a quantity of a mineral acid sufficient to adjust the pH of the gel to less than 7.0,
   (e) aging the acidified hydrogel at a temperature of from 70 to 180° F. for a period of from 0 to 3 hours,
   (f) mixing the hydrogel with a quantity of ammonium hydroxide solution sufficient to raise the gel pH to the range from above 7 to 9.5, (g) aging the hydrogel for 0 to 6 hours at a temperature within the range of from 70 to 180° F.,
(h) spray drying the hydrogel,
(i) washing the spray dried gel to remove soluble impurities, and
(j) redrying the silica gel.

2. The process according to claim 1 wherein the gelling agent is sulfuric acid.

3. The process according to claim 1 wherein the gelling agent is carbon dioxide and wherein the gelled silicate is aged from 0 to 3 hours in step (c).

4. The process of claim 1 wherein the alkali metal silicate is sodium silicate.

References Cited
UNITED STATES PATENTS 3,095,384  6/1963  Jenkins et al. _____ 252—451
3,243,262  3/1966  Carr et al. _____ 23—182

EDWARD J. MEROS, *Primary Examiner.*

U.S. Cl. X.R.

252—451